(12) United States Patent
Feigenblum (10) Patent No.: US 11,524,470 B2
(45) Date of Patent: Dec. 13, 2022

(54) METHOD AND DEVICE FOR MANUFACTURING A COMPOSITE PART WITH A COMPLEX SHAPE

(71) Applicant: ROCTOOL, Le Bourget du Lac (FR)

(72) Inventor: José Feigenblum, Saint Paul (FR)

(73) Assignee: ROCTOOL, Le Bourget du Lac (FR)

( * ) Notice: Subject to any disclaimer, the term of this patent is extended or adjusted under 35 U.S.C. 154(b) by 234 days.

(21) Appl. No.: 16/633,886

(22) PCT Filed: Jul. 23, 2018

(86) PCT No.: PCT/EP2018/069958
§ 371 (c)(1),
(2) Date: Jan. 24, 2020

(87) PCT Pub. No.: WO2019/020583
PCT Pub. Date: Jan. 31, 2019

(65) Prior Publication Data
US 2020/0238639 A1    Jul. 30, 2020

(30) Foreign Application Priority Data

Jul. 25, 2017 (FR) .................................. 17 70791

(51) Int. Cl.
*B29C 70/46* (2006.01)
*B29B 11/16* (2006.01)
(Continued)

(52) U.S. Cl.
CPC ............ *B29C 70/465* (2013.01); *B29B 11/16* (2013.01); *B29C 43/3642* (2013.01);
(Continued)

(58) Field of Classification Search
CPC ......... B29C 70/24; B29C 70/46; B29C 70/22; B29C 70/465; B29C 43/36; B29B 11/16; B29B 15/10; B29K 2101/12; D04B 1/22
(Continued)

(56) References Cited

U.S. PATENT DOCUMENTS

| 8,071,008 | B1 | 12/2011 | Brachos et al. |
| 2011/0057357 | A1 | 3/2011 | Feigenblum et al. |

(Continued)

FOREIGN PATENT DOCUMENTS

| DE | 33 41 292 A1 | 1/1985 |
| EP | 2 694 277 B1 | 6/2016 |

(Continued)

*Primary Examiner* — Camie S Thompson
(74) *Attorney, Agent, or Firm* — IPSIDE; C. Andrew Im; Jean-Christophe Hamann (57) ABSTRACT

A method for making a three-dimensional composite part with a thermoplastic matrix and continuous reinforcement. A pre-impregnated fibrous perform is obtained by three-dimensional knitting. The preform is placed on the punch or in the matrix of a tooling, defining between them a sealed closed cavity. The tooling is closed so as to apply a first pressure to the preform. The cavity is brought to the melting temperature of the polymer impregnating the preform by maintaining the first pressure. The cavity comprising the preform is cooled to a temperature suitable for demolding by maintaining the second pressure. The mold is opened and the part is demolded.

11 Claims, 3 Drawing Sheets

(51) Int. Cl.
*B29C 43/36* (2006.01)
*B29C 70/22* (2006.01)
*B29C 70/24* (2006.01)
*B29K 101/12* (2006.01)

(52) U.S. Cl.
CPC ............ *B29C 70/222* (2013.01); *B29C 70/24* (2013.01); *B29C 2043/3649* (2013.01); *B29K 2101/12* (2013.01)

(58) Field of Classification Search
USPC ............. 442/58, 59, 60, 304, 310, 311, 312; 425/521, 52; 264/257; 428/297.4, 299.4, 428/299.7, 300.4
See application file for complete search history.

(56) References Cited

U.S. PATENT DOCUMENTS

2014/0023828 A1* 1/2014 Feigenblum .............. B32B 3/06
156/196
2018/0057389 A1 3/2018 Feigenblum

FOREIGN PATENT DOCUMENTS

| FR | 2 928 808 A1 | 9/2009 |
| FR | 3 034 093 A1 | 9/2016 |
| WO | 2016/144971 A1 | 9/2016 |

* cited by examiner

METHOD AND DEVICE FOR MANUFACTURING A COMPOSITE PART WITH A COMPLEX SHAPE

RELATED APPLICATIONS

This application is a § 371 application of PCT/EP2018/069958 filed Jul. 23, 2018, which claims priority from French Patent Application No. 17 70791 filed Jul. 25, 2017, each of which is incorporated herein by reference in its entirety.

FIELD OF THE INVENTION

The invention relates to a method and a device for manufacturing a composite part with a complex shape. The invention is more particularly intended for the manufacturing of a three-dimensional composite part such as a box or a dome, or that comprises a plurality of protruding reliefs. The invention also applies to the manufacturing of tubular parts, in particular comprising the junction of several tubes, such as exhaust manifolds. The invention applies to many fields, in particular, but not exclusively, to the manufacturing of luggage or of covers for electronic hardware such as tablets or television screens, the manufacturing of helmets or protective equipment, more generally to three-dimensional mass-produced composite parts, and more particularly, but not exclusively, when these three-dimensional shapes cannot be developed.

BACKGROUND OF THE INVENTION

The prior art in these fields is for example illustrated by document EP 2 694 277. This document describes the manufacturing of a rectangular shell with turned out edges, having the shape of a box with 5 faces, starting from a flat blank, comprising a layup of a stack fabrics preimpregnated with a thermoplastic polymer. Said fabrics are formed and compacted/consolidated into a composite part reinforced with continuous fibers, by a punch-die unit, while a blank holder makes it possible to maintain the fibers under tension during the conformation of the layup to the desired shape. This technique is satisfactory but imposes substantial trimming of the part after forming and consolidation, and does not make it possible to produce deep drawn stamping. The corner fittings connecting the three-dimensional junctions between the faces of the box are areas that are particularly stressed, wherein wringing of the polymer is likely to occur, allowing fibers to appear that are uncoated, unsightly, and even wrinkles or tears.

OBJECT AND SUMMARY OF THE INVENTION

The invention aims to overcome the disadvantages of prior art and for this purpose relates to a method for making a three-dimensional composite part with a thermoplastic matrix and continuous reinforcement comprising the steps of:

a. obtaining a preimpregnated fibrous preform of the thermoplastic polymer forming the matrix corresponding to the shape of the final part, by three-dimensional knitting;

b. placing the preform between the punch and the die paired with a tooling, defining between them a sealed closed cavity;

c. closing the tooling in such a way as to apply a first pressure to the preform;

d. bringing the cavity to the melting temperature of the polymer impregnating the preform by maintaining a first pressure;

e. cooling the cavity comprising the preform to a temperature suitable for demolding by maintaining a second pressure;

f. opening the mold and demolding the part.

Thus, the knitting method makes it possible to obtain a preform of a three-dimensional shape, corresponding substantially to the shape of the final part, complete, without assembling plies and without conformation by deformation. Using a closed cavity associated with the pressure-temperature cycle makes it possible to directly obtain a part with finished dimensions with clean edges that does not need any trimming. The stamping depth is not limited due to the absence of forming. As the preform is preimpregnated with a thermoplastic polymer, it can be stored with no limit of duration and be made on a site distant from the transformation site. The method is therefore particularly suited for industrial mass production suitable for the fields targeted by the invention.

The term "preimpregnated", in the context of the invention and applied to the preform obtained by the method object of the invention, designates a preform of dry and flexible appearance, comprising the polymer forming the matrix of the future composite part. The means for integrating the polymer to a knitted preform satisfying these characteristics are described in particular embodiments of the invention. The impregnation strictly speaking takes place via percolation between the fibers of the polymer brought to melting during steps d) and e) of the method object of the invention.

The invention is advantageously implemented according to the embodiments and alternatives disclosed hereinafter, which are to be considered individually or according to any technically permissible combination.

According to an embodiment, the method of the invention comprises, before step d) a step consisting in an evacuation of the molding cavity delimited by the punch and the die and containing the preform. Thus, the vacuum in said cavity and the application of the first pressure make it possible to ensure the degassing of the preform and a good impregnation of the latter during the melting of the impregnation polymer.

Advantageously, the method of the invention comprises between steps d) and f) a step of:

g. maintaining the temperature during a time suited for the impregnation of the preform by the polymer.

This maintaining time, which depends on the viscosity of the polymer and the fiber content, makes it possible to ensure a uniform impregnation of the preform.

Advantageously, a second pressure is applied on the preform during step g). Thus, the application of the second pressure, when the polymer forming the matrix is already fluidized, makes it possible to carry out the compacting. Maintaining this pressure during the cooling makes it possible to calibrate the thickness and the shape of the part.

Advantageously, the knitted preform is obtained using a thread consisting of strands of the reinforcing fiber commingled with strands made of the impregnation polymer. This embodiment provides a uniform impregnation of the preform during steps d) and e).

Similarly, the knitted preform is obtained using a thread consisting of the reinforcing fiber coated with the impregnation polymer.

According to another alternative embodiment, the preform is knitted using a thread made of the reinforcement fiber and a thread made of the impregnation polymer.

According to a particular case of this latter alternative, the reinforcing fiber is a polymer the melting temperature of which is greater than the melting temperature of the impregnation polymer.

According to an alternative embodiment, the preform is knitted by using the fingerweaving knitting technique. This alternative uses the most widespread and the most versatile knitting technique in terms of the shapes that can be produced, however in many cases, the finishing or closing of the three-dimensional preform requires the carrying out of a seam.

For this purpose, according to alternative implementations of this embodiment, the method object of the invention comprises before step b) a sewing step to close the contour of the preform. This embodiment makes it possible to prepare closed contour preforms ready to be used, even if the knitting technique does not make it possible to obtain this characteristic directly during the knitting.

Alternatively, the method comprises between steps b) and c) a step of:

h. closing the contour of the preform by a weld.

This embodiment takes advantage of the constitution of the preform integrating the impregnation polymer. This weld is carried out before step b) or when the preform is placed on the punch or in the die, this in order to ensure a precise positioning of said weld.

According to another alternative embodiment, the preform is knitted by using the transferred mesh technique. This technique produces, according to the alternatives, single or double jersey fabric and makes it possible to produce a three-dimensional preform in a single part without a seam or joint, at the price of a more complex knitting.

According to an advantageous embodiment of the method of the invention, the first and second pressures are applied on the preform by varying between two values the gap between the punch and the die, on the closed cavity. This embodiment provides a more precise control of the thickness and therefore of the calibration of the preform.

The invention also relates to a tooling for the implementation of the method object of the invention, said tooling comprising:

x. a punch made of an electrically conductive material;

y. a die paired with the punch so as to form a cavity between the molding surfaces of the punch and the die, and made of an electrically conductive material;

z. an induction circuit for heating the molding surfaces of the punch or of the die;

u. a high-frequency current generator to power the induction circuit.

Using induction as an autonomous heating mode of the tool makes it possible to reduce the cycle times and the production of mass-produced parts.

According to an embodiment, the cavity delimited between the punch and the die comprises a conicity that flares towards the base of the punch. Thus, the pressure on the preform is controlled by the relative displacement of the die and of the punch, which according to the conicity along turned out edges, makes it possible to control the value of the gap in the closed cavity on all of the faces of the preform.

Advantageously, the punch and/or the die comprise a cooling circuit for the circulation of a fluid. This arrangement reduces the cycle time for producing a part by accelerating step f) of the method.

Advantageously, the molding surfaces of the punch and of the die delimiting the cavity are made of a ferromagnetic material the Curie point of which is equal to the melting temperature of the polymer impregnating the preform. This embodiment simplifies the control of the temperature in the cavity, in particular in order to prevent burns when the reinforcing fibers of the preform are subject to this phenomenon.

According to an embodiment of the tooling for the implementing of the method object of the invention, the latter comprises a die made of a thermally conductive material and an inductor extending into a cavity made in said die wherein the volume of the molding cavity is variable independently of the coming together of the punch and of the die. This embodiment is suitable for the implementing of a preform comprising fibers that are electrically conductive or not. The variation in the volume of the molding cavity makes it possible to ensure the compacting and the calibration in thickness of the finished part.

According to an alternative embodiment of the tooling object of the invention, the punch comprises an inflatable bladder. This alternative makes it possible to provide a uniform pressure over the entire surface of the preform in particular during steps e) and f) of the method.

According to another alternative embodiment of the tooling the punch comprises a movable portion actuated by the coming together of the die and of the punch. This alternative makes it possible to control the gap therefore the thickness of the finished part in the molding cavity.

According to another alternative, the external surface of the punch comprises a flexible sealed tarpaulin wherein a gaseous pressure is applied between the punch and the tarpaulin for carrying out steps c) to f) of the method of the invention.

Advantageously, the tarpaulin comprises on its face in contact with the preform, a load of a material that is sensitive to heating via induction. Thus, the tarp participates in the uniform heating of the preform.

BRIEF DESCRIPTION OF THE DRAWINGS

The invention is disclosed hereinafter according to its preferred embodiments, which are in no way limiting, and in reference to FIGS. 1 to 4, wherein.

DETAILED DESCRIPTION OF THE EMBODIMENTS

The knitting techniques are known in prior art and make it possible to make a three-dimensional shaped fabric, by the assembly of a plurality of interlaced threads according to loops or meshes. According to the mode of knitting used, complex preforms are made in a single knitting operation. According to other knitting techniques the contour of the part cannot be closed and requires in this case a step of closing by a seam, or more advantageously by welding as disclosed further on.

Figure 5:
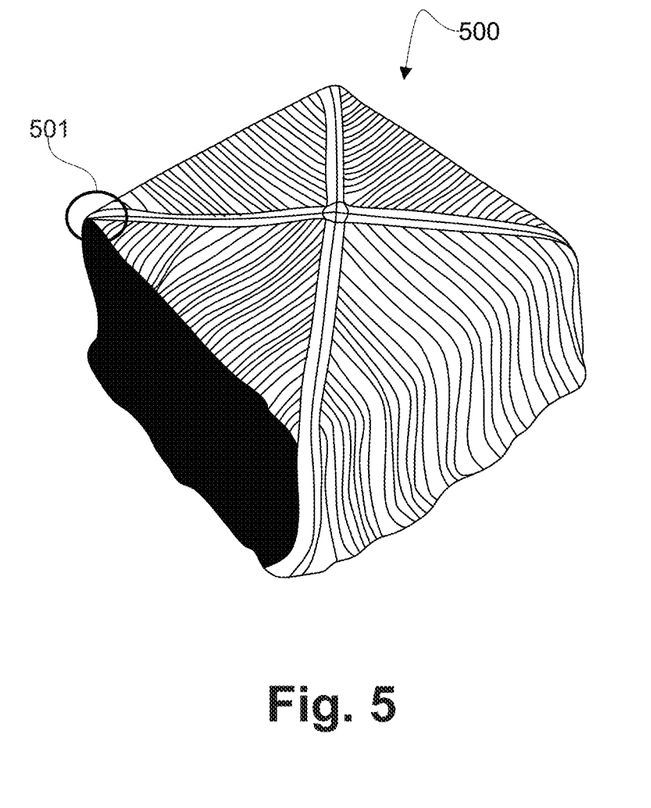
FIG. 5 shows according to a perspective view an embodiment of a knitted preform with a closed contour comprising 5 faces and three-dimensional connecting areas between the faces.

FIG. 5 shows an example of a three-dimensional preform (500) comprising 5 faces and 4 three-dimensional connecting areas (501) between the faces, these connecting areas are commonly designated by the term "corner fitting". In order to correctly see the three-dimensional shape of the knitted preform (500) the latter is shown here placed on a support, said support is for example the punch of a tooling. The knitting technique used in this embodiment allows for a continuity of the fibers over the entire surface of the preform, the contour is closed. The strands are continuous, including in the three-dimensional connecting areas (501) which are areas that cannot be developed, i.e. they cannot be placed flat while retaining the length of the strands. As FIG. 5 shows, the knitting technique makes it possible to obtain a preform which is already the final shape of the part or which has a shape very close to the latter.

The knitting step of the method of the invention is advantageously, but not exclusively, implemented by means of a plain weft knitting machine which offers the most versatility in terms of forms that can be made with a closed contour. The forms that can be made include box forms comprising corner fittings, forms substantially with the shape of a dome or cap, such as a helmet, tubular shapes comprising junctions of tubes, or even a combination of these different forms, optionally comprising recesses.

According to prior art, the three-dimensional knitting is used for the production of dry fibrous preforms, later subsequently impregnated with a thermosetting resin via a method implementing a transfer of liquid resin in a mold, such as the RTM (Resin Transfer Molding) method.

This method is however not suitable for mass production.

The method of the invention implements a knitted fibrous preform, comprising itself the polymer that will form the matrix of the composite part.

For this purpose, the knitting step of the method of the invention implements reinforcing fibers such as fibers of glass, carbon, aramide, metal, polymers, or natural fibers such as fibers of flax, coconut, sisal, jute, or bamboo, where applicable sized and spun beforehand, or a combination of these fibers, combined with the thermoplastic polymer constituting the matrix of the future composite part.

By way of examples, said polymer is introduced commingled with the reinforcing fiber, for example in the form of strands of said fiber, spun with strands of said polymer and optionally twisted, or in the form of reinforcing fibers coated with said polymer, or by knitting threads of said polymer with the threads made of the reinforcing fiber.

Regardless of the mode of production, the absence of tackiness of the thermoplastic polymer allows for the implementation thereof jointly with the reinforcing fibers during the knitting step.

By way of non-limiting examples, said thermoplastic polymer is a polyetherketone (PEK), polyether etherketone (PEEK), polyetherimide (PEI), a thermoplastic polyester, a polyphenylene sulfide (PPS), polyamide (for example PA6 or PA6-6), an acrylonitrile butadiene styrene (ABS).

According to other examples, said polymer is chosen from biosourced polymers such as:

polyamides (PA), in particular PA11
biosourced polyethylene (PET);
polylactic acid (PLA);
or biosourced polyesters The combination of the mode of obtaining the preform, which interlaces the fibers and allows for a continuity of the interlacing over the entire form, and of a thermoplastic polymer, makes it possible to produce light parts that are particularly resistance to impacts, and according to the choice of the polymer, resistant to temperature and flame. Thus, the method of the invention is particularly suited for the production of parts subjected to this type of stress, such as luggage elements, personal protective equipment such as helmets, harnesses, shields, elbow-pads or knee-pads, protective shells or light armored elements.

Figure 1:
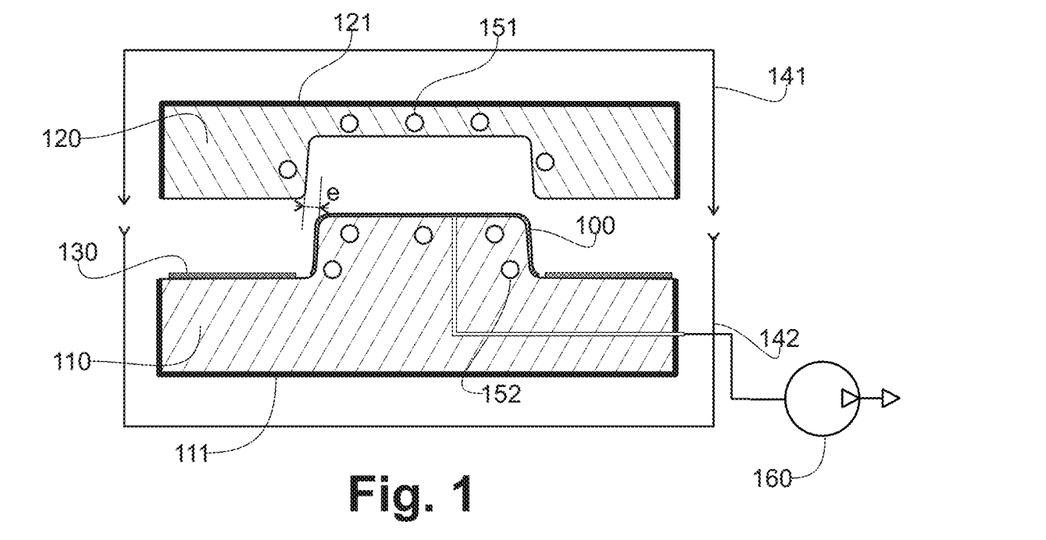
FIG. 1 shows an exemplary embodiment of a tooling according to a cross-section view, shown in open position, for the implementing of the invention.

FIG. 1, according to an embodiment of the method of the invention, suitable for the implementation of a preform of which the reinforcing fibers are not electrically conductive, the preform (100), knitted beforehand and comprising reinforcing fibers and the thermoplastic polymer of impregnation of the final part, is placed on the portion forming the punch of the tooling.

Figure 2:
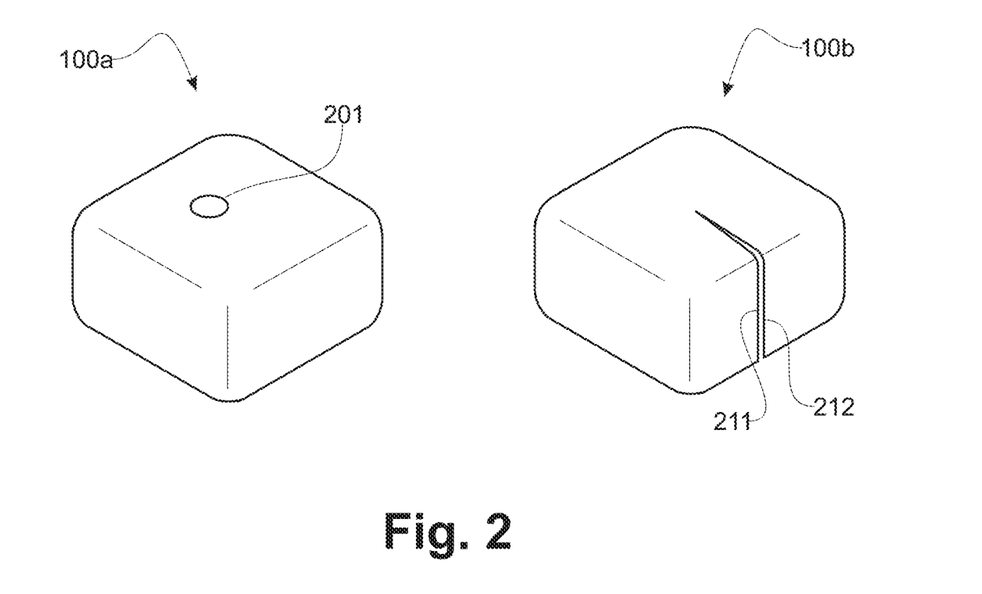
FIG. 2 shows two preform examples knitted in the form of a half-shell comprising three-dimensional connecting areas.

FIG. 2, according to a non-limiting embodiment, the preform (100a) is in the form of a shell, comprising three-dimensional connecting zones, called "corner fittings". By way of an example for the purposes of illustration it is a half-shell of a suitcase. According to an embodiment, said preform (100a) comprises a recess (201) that is carried out directly during the knitting of said preform. Compared to the techniques of prior art for implementing thermoplastic composite materials, such as stamping consolidation in shape, the technique of obtaining the preform by knitting makes it possible to retain in the connecting areas, in particular the corner fittings, a reinforcing fiber to polymer ratio that is comparable to the reinforcing ratio in the rest of the part while still preventing the formation of wrinkles in these same areas.

Returning to FIG. 1, although the knitting technique allows for the production of such a preform according to a closed contour, then, as the tooling is in open configuration, said preform (100) is simply threaded onto the punch (110) by covering said punch with said preform (100), after having, if necessary, sprayed a demolding agent on said punch. Such an operation is easily carried out manually or by means of a manipulator or a robot. The implementing of the self-heating tooling such as shown hereinafter, allows the punch to be at ambient temperature during this step.

FIG. 2, according to another embodiment, the knitting technique used, does not make it possible to close the contour of the preform (100b) and said preform comprises a contour discontinuity, delimited by two open edges (211, 212).

Returning to FIG. 1, if the knitting technique does not make it possible to obtain a knitted preform with a closed contour, then, the preform being placed on the punch (110), the positioning of said preform in the tool is stabilized by carrying out at least 2 weld points joining the open edges of the contour discontinuity. The presence of the polymer in the knitted preform makes it possible to carry out such a weld. Said weld is carried out for example by means of a soldering iron, alternatively, it is carried out in the form of points or a weld line by other means known from prior art, such as by laser or by ultrasound.

According to this embodiment of the tooling, the punch advantageously comprises means for positioning open edges of the preform one with respect to the other, for example in the form of pins or of hooks introduced in the meshes. Thus, the preform is perfectly positioned on the tool.

The tooling consists of at least two portions (110, 120) that can be separated into an open configuration and a closed configuration, defining a punch (110) and a die (120). The punch and the die are paired in such a way that they delimit between them, on their molding surfaces and during the closing of the tooling, a gap (e), exaggerated in FIG. 1, corresponding to the final thickness of the part produced. Thus, the space between the punch and the die defines a molding cavity wherein the preform (100) is located.

According to an embodiment, means (160) makes it possible to vacuum the gas in the molding cavity comprising the preform (100) once the tooling is closed.

According to an embodiment, the punch and the die are made of a ferromagnetic material and are covered on their outer faces, except for the molding surfaces, with a continuous layer (111, 121) of an electrically conductive and non-ferromagnetic material, such as copper. During the closing of the tooling, the portions of the tooling comprising the punch and the die are separated from one another by a layer of an electrically insulating material (130). This layer of insulating material also provides the seal of the cavity formed between the punch and the die during the closing of the tool.

The punch-die unit is inserted into an induction circuit comprising two half-coils (141, 142) one (141) of which being integral with the punch and the other (142) with the die. The closing of the tooling has for effect to electrically connect the two half-coils. The coil thus formed, surrounding the tooling, is connected to a high-frequency current generator (not shown), in such a way that the power supply to said coil causes the circulation of induced currents, over the surfaces of the tooling. The induced currents circulate in a reduced thickness of material on the surface of the tooling. Therefore, said induced currents circulate in the layers of coating (121, 111), and due to the cut-off carried out by the insulating layer (130) between the two portions of the tool, on the molding surfaces of the cavity defined between the punch and the die.

Said molding surfaces made of a ferromagnetic material rise quickly in temperature due to the circulation of these high-frequency induced currents, and transmit their heat to the preform (100).

Under the effect of the temperature, the polymer contained in the knitted preform is brought to its melting temperature, and, the preform being confined in a closed and sealed cavity, said polymer uniformly impregnates the preform.

The closing pressure applied on the mold as well as on the gap (e) between the punch and the die, calibrate the thickness of the final part. Using heating via induction, in the configuration of the mold according to this embodiment, makes it possible to concentrate the heating on the molding surfaces of the cavity, without needing to heat the entire mass of the tooling.

Said molding surfaces rise quickly in temperature, said temperature is controlled, for example, by selecting the ferromagnetic material that makes the mold according to its Curie temperature.

Advantageously, the punch (110) and/or the die (120) of the tooling include channels (151, 152) for the circulation of a heat transfer fluid, for example water, allowing for a rapid cooling of the molding surfaces.

The molding cavity and the preform (100) being brought to a temperature at least equal to the melting temperature of the polymer included in said preform, said temperature is maintained during a suitable time between a few seconds and 1 minute, in order to ensure a uniform impregnation of the preform by the polymer.

Said maintaining time is according to the content of fibrous reinforcement and to the viscosity of the melted polymer at the maintaining temperature. The more viscous the polymer and the higher the fiber content, the longer the maintaining time. The maintaining time is easily determined through trials.

After the suitable maintaining time, the electrical power supply of the coil (141, 142) is stopped, and the molding cavity is cooled by the circulation of a heat transfer fluid in the cooling channels (151, 152) of the tooling.

During the steps of heating, maintaining and cooling, the closing pressure of the tooling is maintained.

According to an alternative embodiment a second pressure, greater than the first pressure, is applied on the preform at the end of heating and during the maintaining step. This second pressure is applied, for example, by relatively displacing the punch with respect to the die. According to an embodiment, the punch and the die have a slight conicity, flaring towards the base of the punch in such a way that this relative displacement applies said pressure, by the reducing of the gap (e), over all of the surfaces of the preform.

When the cooling of the molding cavity by way of circulation of the heat transfer fluid reduces the temperature of the latter to a temperature less than the glass transition temperature of the polymer, or more generally to a temperature where the rigidity of the polymer is sufficient to manipulate the part thus produced without deforming it, the mold is opened and the part is demolded.

Then the cycle resumes with a new preform. The manufacturing time of the part between two openings of the mold is according to the dimension of the part, the nature of the polymer and the fiber content, but is generally between 1 and 5 minutes, substantially according to the time for maintaining at temperature.

Using heating via induction makes it possible to ensure that a sufficient heating temperature is reached during each cycle in order to provide a uniform impregnation of the part. The heating speed, about $2°$ $C.·s^{-1}$, authorized by this heating method, also allows for the implementing of natural fibers, which are sensitive to burning, without risk of degrading said fibers.

The implementation steps described hereinabove apply in the same way by initially positioning the preform in the die rather than on the punch and are also adapted to the implementing of a knitted preform the form of which is other than that of a half-box.

Figure 3:
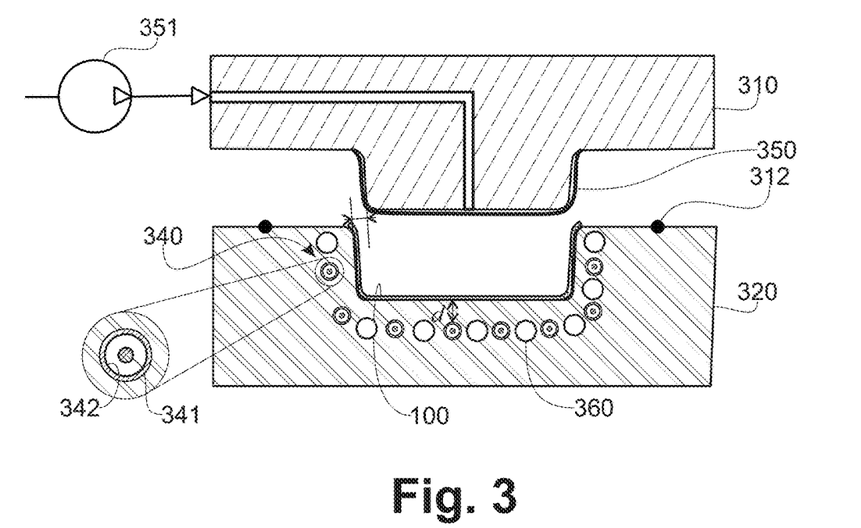
FIG. 3 shows according to a cross-section view and in open position another embodiment of a tooling for the implementation of the method object of the invention.

In FIG. 3, according to another embodiment of the method of the invention, suitable for any type of fiber including electrically conductive fibers, the tooling comprises at least two portions, in the form of a punch (310) and of a die (320). According to this embodiment, the die (320) is made of a metallic material that conducts heat well such as an aluminum or copper alloy without these examples being limiting.

The die (320) comprises a set of ducts (340) wherein inductors (341) extend. Said inductors have the form of copper tubes or Litz cables. According to an embodiment, the inside of said ducts comprises a lining (342) formed from a ferromagnetic material over a thickness between 0.2 mm and 2 mm. Therefore, when the inductor (341) is powered with high-frequency current, the induced currents circulate in the ferromagnetic lining (342), causing the heating of the latter.

The heat is transmitted to the die and propagates via conduction to the molding surface, which rises in temperature.

Advantageously said ducts (340) comprising the inductors (341) are located at a distance d from the cavity of the die in such a way as to ensure a uniform temperature on the molding surfaces of said die.

Alternatively, the die is made of a ferromagnetic material, for example a steel, in such a case the lining of the ducts (340) comprising the inductors (341) is not necessary.

Advantageously, the die comprises channels (360) for the circulation of a heat transfer fluid for the purposes of the cooling thereof.

The mold is shown here in open position. Bringing together the punch (310) and the die (320) as well as the sealing means (312) make it possible to define a sealed cavity wherein the knitted preform (100) is included.

According to this embodiment, the punch comprises a bladder (350) and means (351) to inflate said bladder. The bladder (350) is made of an elastomer that resists the melting temperature of the polymer included in the preform.

By way of example said bladder is formed from silicone loaded with carbon. This embodiment makes it possible to compact all of the faces of the preform, by inflating said bladder, even if the die cavity does not feature any conicity flaring towards the base of the punch, and even if it features an inverse conicity, for example when the method of the invention is used for manufacturing a helmet. In this case, the die comprises at least two portions that can be separated in order to allow for the demolding of the final part.

This embodiment, wherein the punch comprises a bladder (350), can also be used in the embodiment of the tooling shown in FIG. 1. In this case, the face of the bladder coming into contact with the preform (100) during the manufacture of the part comprises an electrically conductive coating electrically connected to the rest of the punch, in order to ensure the circulation of the induced currents, this coating can furthermore be ferromagnetic.

According to an example of the use of the tooling according to this embodiment, the knitted preform (100) is inserted into the cavity of the die (320). The punch is brought closer to the die creating a sealed cavity wherein the preform is included. The bladder (350) is inflated at the first pressure in order to ensure contact with the preform. The inductors (341) are powered with high-frequency current, which has for effect to heat the molding cavity and to bring the polymer included in the knitted preform to its melting temperature.

The inflating pressure of the bladder (350) is increased in such a way to provide the compacting of the preform. The temperature is maintained in the molding cavity in such a way to provide a uniform impregnation of the preform, with this impregnation time being a function of the fiber content and of the viscosity of the polymer.

Then, the powering of the inductors is stopped and the heat transfer fluid is sent into the cooling channels (360) so as to cool the mold and the part thus produced, to a temperature suitable for the demolding thereof.

In the case where the tooling shown in FIG. 1 comprises such an inflatable bladder that includes a conductive coating such as described hereinabove, whether this bladder is connected to the die or to the punch, the sequence of operations such as described hereinabove is the same.

As with the example in FIG. 1, other embodiments are possible, where the punch does not comprise a bladder and where the means for heating and cooling are included in the punch or even in the punch and the die, with the preform being arranged on the punch rather than in the die.

Thus, the combination of using a mold with autonomous heating via induction, according to any embodiment shown hereinabove or a combination of these embodiments, with a knitted preform comprising the impregnation polymer thereof makes it possible to mass produce parts with a complex shape comprising a high fiber content, with reduced lead times, and in a single consolidation operation.

The method object of invention is particularly suited to producing composite parts aimed at high-consumption markets.

The association of a high fiber content, of a thermoplastic polymer constituting the matrix and of the mode of organization of the fibers in the composite, makes these parts particularly resistant to impacts and makes it possible to retain a substantial fiber content in zones which according to the methods of prior art, have a reduced fiber content, in particular the corner fittings in the example shown.

However these areas, in particular the three-dimensional connecting areas or corner fittings, are areas that are particularly stressed on the products targets by the invention, in particular in terms of impacts, such as on a suitcase shell.

Figure 4:
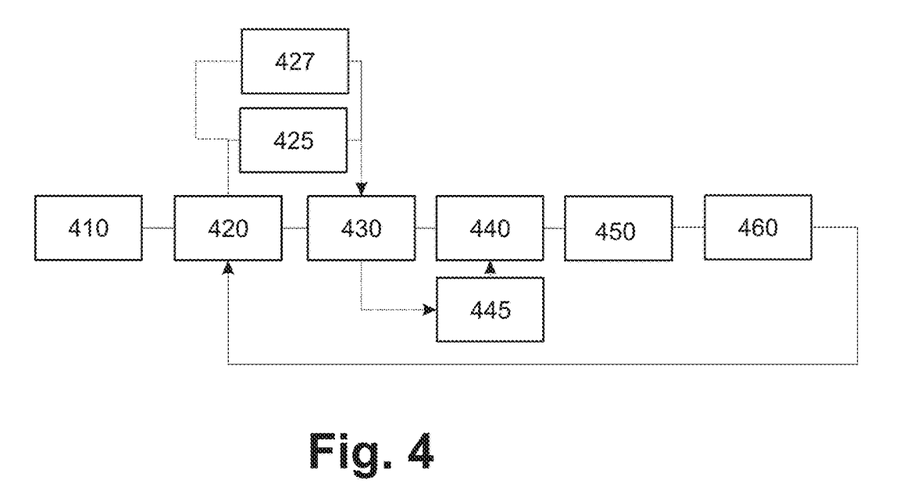
FIG. 4 shows a block diagram of the method of the invention.

FIG. 4, according to a first step (410) of the method of the invention, the preform is knitted in such a way as to correspond to the shape of the final part. Said preform comprises the thermoplastic impregnation polymer of the final part, either in commingled form in the knitted threads, or in the form of a coating on the knitted threads, or by the knitting of reinforcing threads and of threads made of the impregnation polymer.

Said polymer is stable in such a way that said preform can be stored without a limit in terms of time or produced on a site distant from the transformation site.

According to a loading step (420) the preform thus obtained is set on or in the tooling according to any embodiment thereof, with the mold being open.

According to a particular embodiment, corresponding to the case where the knitting technique does not make it possible to obtain a preform with a closed contour, a step (425) of welding is carried out directly in the tooling so as to close the contour of the preform.

According to a step (430) of impregnation/consolidation, the mold is closed, thus applying a first pressure on the preform and the molding cavity delimited between the punch and the die is brought to a temperature greater than or equal to the melting temperature of the impregnation polymer.

According to a particular embodiment, the method of the invention comprises a step (427) of evacuation of the cavity comprising the preform after the closing of the mold.

According to a maintaining step (440) the molding cavity and the preform are maintained at the temperature reached during the preceding step (430) while still maintaining the contact pressure between the molding surfaces of the punch and of the die with the preform.

According to an alternative embodiment, the maintaining step (440) comprises a compacting step (445) of increasing the pressure on the preform, either by approaching the punch and the die or by applying an additional inflation pressure on the expandable means (bladder) of the die or of the punch.

According to a cooling step (450) the molding cavity and the preform are cooled by the circulation of a heat transfer fluid in the mold, while still maintaining the pressure on the preform.

The cooling (450) is continued until the temperature in the molding cavity is less than or equal to the glass transition temperature of the impregnation polymer.

According to a demolding step (460) the mold is opened and the part is demolded. The cycle then resumes at the loading step (420) with a new preform.

The invention claimed is:

1. A method for making a three-dimensional composite part with a thermoplastic matrix and continuous reinforcement, comprising:

obtaining a three-dimensional shaped half shell of a suitcase comprising three-dimensional corner fittings fibrous preform with continuous reinforcement pre-impregnated of a polymer forming the thermoplastic matrix corresponding to a shape of the three-dimensional composite part by a three-dimensional knitting;

placing the three-dimensional preform between a paired punch and die of a tooling having a closed and an open state comprising a gap between the paired punch and die, defining a sealed closed cavity between the paired punch and die when the tooling is in the closed state;

closing the tooling so as to apply a first pressure to the three-dimensional preform;

bringing the sealed closed cavity to a melting temperature of the polymer impregnating the preform, referred to as an impregnation polymer, by maintaining the first pressure;

cooling the sealed closed cavity comprising the preform to a temperature suitable for demolding while maintaining a second pressure;

opening the sealed closed cavity and demolding the three-dimensional shaped composite part.

2. The method according to claim 1, further comprising an evacuation of the sealed closed cavity after the tooling is closed.

3. The method according to claim 1, further comprising maintaining the melting temperature for a time suitable to impregnate the preform of the polymer.

4. The method according to claim 3, wherein the second pressure is applied on the preform while maintaining the melting temperature.

5. The method according to claim 4, wherein the first pressure and the second pressure are applied on the preform by varying between two values of a gap between the punch and the die in the sealed closed cavity.

6. The method according to claim 1, wherein the preform is obtained using a thread made of strands of a reinforcing fiber commingled with strands made of the impregnation polymer.

7. The method according to claim 1, wherein the preform is obtained from a thread coated with the impregnation polymer.

8. The method according to claim 1, wherein the preform is obtained by knitting threads made of a reinforcing fiber and of threads made of the impregnation polymer.

9. The method according to claim 8, wherein the reinforcing fiber is a polymer with a melting temperature which is greater than the melting temperature of the impregnation polymer.

10. The method according to claim 1, further comprising closing a contour of the preform by a weld after placing the preform in the sealed closed cavity and before closing the tooling.

11. The method according to claim 1, wherein the preform is knitted by using a transferred mesh technique.

* * * * *